C. H. WHITLOCK.
Tree Protector.
No. 44,131. Patented Sept. 6, 1864.
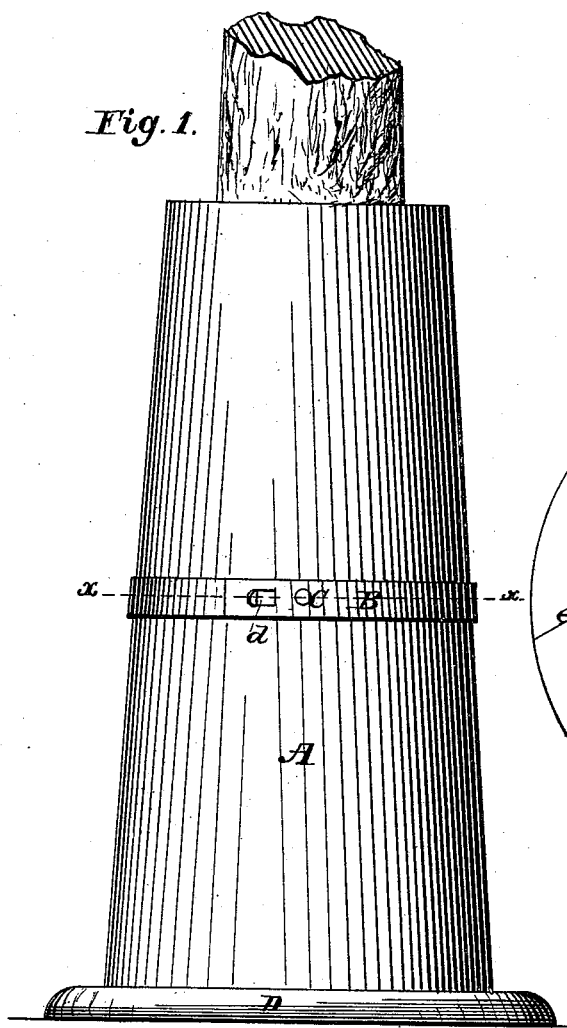
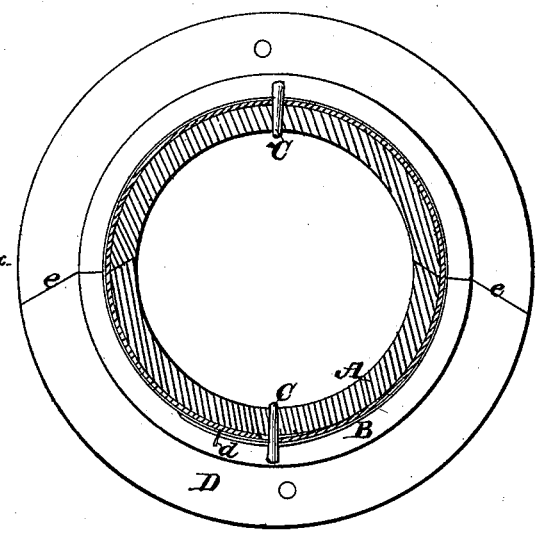
Witnesses
Patty Davenport
B. Davenport
Inventor.
Cyrus H. Whitlock

UNITED STATES PATENT OFFICE.

CYRUS H. WHITLOCK, OF WHITING, VERMONT.

TREE-PROTECTOR.

Specification forming part of Letters Patent No. 44,131, dated September 6, 1864.

*To all whom it may concern:*

Be it known that I, CYRUS H. WHITLOCK, of Whiting, in the county of Addison and State of Vermont, have invented a new and improved method of protecting fruit and shade trees from destruction and injury by insects and vermin and other causes in orchards and other grounds where they are cultivated; and I do hereby declare that the following is a full and exact description thereof, reference being had to the accompanying drawing, and to the letters of reference marked thereon.

The nature of my invention consists in providing a cylinder with a flange at the bottom large enough to secure the cylinder in an upright position, so as not to press or rub the bark of the tree, and of any convenient size that may be desired for the protection of the tree.

To enable others skilled in the art or manufacture of such articles to make and use my invention, I will proceed to describe its construction.

I make what I call my "tree-protector" of clay, or a mixture of clay and other malleable substance, such as the potter makes his stoneware of. It is of cylinder form, one, two, or three feet high, as you choose, cast or molded round in circular form fitted for the size of the tree. Then sever it on two sides in the center perpendicularly on a miter and make apertures for dowels or pins to keep in place when baked and put together and placed around the tree, and confine the protector together by a band of iron locked together, and by pins, as seen in the drawing.

What I claim as my invention, and desire to secure by Letters Patent, is—

The cylindric form and flange of my protector.

CYRUS H. WHITLOCK.

Witnesses:
MAGGIE BRILL,
PATTY DAVENPORT.